L. KING.
Lightning-Rod Joint.
No. 49,633. Patented Aug. 29, 1865.
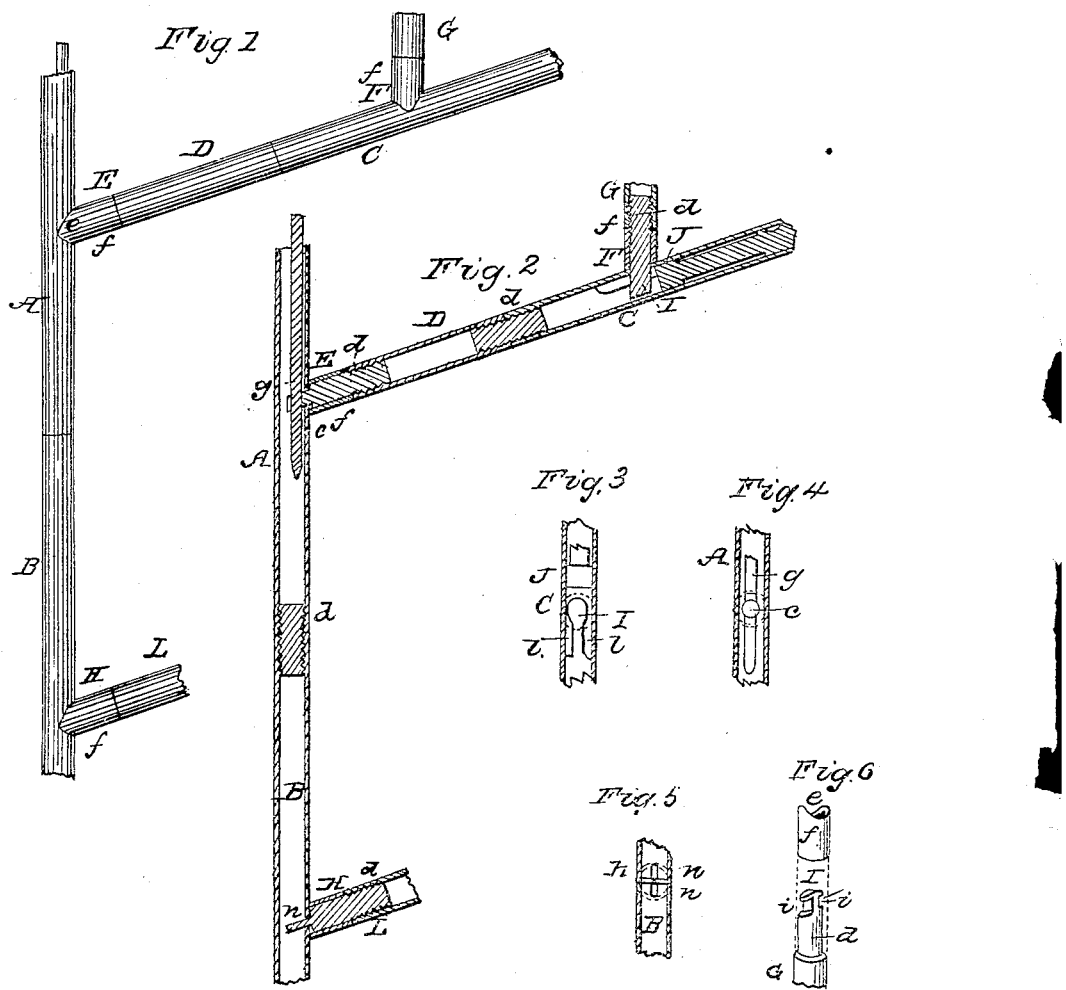
Attest
W. H. Burridge
C. W. McClellan
Inventor
L. King

UNITED STATES PATENT OFFICE.

L. KING, OF EAST CLEVELAND, OHIO.

JOINTS OF LIGHTNING-RODS.

Specification forming part of Letters Patent No. 49,633, dated August 29, 1865.

*To all whom it may concern:*

Be it known that I, L. KING, of East Cleveland, in the county of Cuyahoga and State of Ohio, have invented certain new and useful Improvements in Lightning-Rods; and I do hereby declare that the following is a full and complete description of the construction of the same, reference being had to the accompanying drawings, making a part of this specification, in which—

Figure 1 represents a portion of a lightning-rod. Fig. 2 is a section of the same. Figs. 3, 4, 5, and 6 are detached sections that will be referred to in the description.

Like letters of reference denote like parts in the different views.

My improvement relates to constructing a lightning-rod in such a manner that the joints of the main rod and the joints at the junction of the branch parts of the rod with the main rod are made without links or outside projections, forming one continuous rod that presents an unobstructed surface for the passage of the electric currents.

There are various modes of forming the joints represented in the drawings, and will be described as follows: Where sections of a main or straight rod are to be connected together, as the sections or pipes A and B, a dowel, $d$, is screwed into the end of one rod or pipe, so that a part of it will project, onto which the end of the other pipe is screwed, forming a close joint, even on the outside, and which is perfectly secure.

In uniting branch rods or pipes to a straight or main rod, as at E, one end of the dowel is screwed in the branch pipe or section D, as represented, and on the projecting end of the dowel is placed a collar, $f$, fitting up close to the end of the pipe D, being of the same shape and diameter across. The other end of the collar is curved out, as shown at $e$ in Figs. 1 and 6, which is a perspective view of the collar detached. It is cut out in that form, so as to fit close round the rod A, and it is curved out more or less on either side, according to the angle that the branch rod is placed in reference to the rod with which it is to form a junction. The end of the dowel extending into the pipe A is formed into a head, $c$, (seen in Figs. 2 and 4,) in which there is a hole or opening, that a pin, $g$, in the pipe A is put through, whereby it is held firmly in place, that when the end of the pipe D is screwed onto the dowel against the collar a perfectly-close joint is formed, in connection with the main rod A and collar, as represented.

Another manner of forming and securing such a joint is shown at F in Figs. 2, 3, and 6. The end of the dowel extending into the pipe C is for a support to a head, I, as clearly shown in Fig. 6, which represents the dowel in the pipe G with the collar detached. The head is cut or notched out on the sides, as at $i$, so that a staple, J, with two fingers or prongs, $l$, (seen in Fig. 3,) put into the pipe C, will fit into the grooves or notches $i$, by which the dowel will be firmly secured in place. The collar on the dowel, which is the same as the one before described, fits round the pipe C when the branch pipe C is screwed onto the end of the dowel, forming close joints, as represented.

Still another form of securing such a joint is shown at H in Figs. 2 and 5, in which the inner end of the dowel is formed into a flat rounded head, that is put through a slot, $n'$, in the pipe B, and then turned at right angles to the slot, as shown in Fig. 5, which holds the dowel firmly, thereby securing a close joint when the collar is put on and a pipe, L, screwed onto the dowel in the manner before stated.

In any of these ways, as described, joints can be formed at the junction of branch sections of the rod with one another, where they come together at any angle, making a smooth, close, and secure joint, by which, together with the manner of joining straight pipes directly, a continuous or branching rod is formed, with a perfectly-smooth surface on the outside, which presents no obstruction to the passage of the electric currents.

Where these joints are formed in the ordinary way, with links or projecting collars, the projections are not only liable to obstruct the currents, but rain and wet lodge on them, which oxidizes the metal, thereby producing an imperfect conductor, the dangerous consequences of which are well known.

What I claim as my improvement, and desire to secure by Letters Patent, is—

The connection of branch pipes or rods, by means of the pin $g$, head $c$, and collar $f$, with the dowel $d$, or their equivalents, substantially as described.

L. KING.

Witnesses:
W. H. BURRIDGE,
A. W. McCLELLAND.